(12) United States Patent
Lim et al.

(10) Patent No.: US 9,137,809 B2
(45) Date of Patent: Sep. 15, 2015

(54) METHOD AND DEVICE FOR REMOVING INTER-CELL INTERFERENCE OF AN ACCESS POINT IN A WIRELESS ACCESS SYSTEM

(75) Inventors: Jaewon Lim, Anyang-si (KR); Jeonghoon Mo, Seoul (KR); Jihwan Kim, Daejeon (KR); Jeongho Kwak, Daejeon (KR); Byounghoon Kim, Anyang-si (KR); Song Chong, Daejeon (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 110 days.

(21) Appl. No.: 13/982,086

(22) PCT Filed: Dec. 14, 2011

(86) PCT No.: PCT/KR2011/009609
§ 371 (c)(1),
(2), (4) Date: Jul. 26, 2013

(87) PCT Pub. No.: WO2012/115339
PCT Pub. Date: Aug. 30, 2012

(65) Prior Publication Data
US 2013/0315091 A1    Nov. 28, 2013

Related U.S. Application Data

(60) Provisional application No. 61/466,050, filed on Feb. 24, 2011.

(51) Int. Cl.
*G01R 31/08*      (2006.01)
*H04W 72/08*    (2009.01)
*H04W 16/10*    (2009.01)
*H04W 24/10*    (2009.01)
*H04W 28/04*    (2009.01)
*H04W 88/08*    (2009.01)
*H04W 92/20*    (2009.01)

(52) U.S. Cl.
CPC ............ *H04W 72/082* (2013.01); *H04W 16/10* (2013.01); *H04W 24/10* (2013.01); *H04W 28/048* (2013.01); *H04W 88/08* (2013.01); *H04W 92/20* (2013.01)

(58) Field of Classification Search
None
See application file for complete search history.

(56) References Cited

U.S. PATENT DOCUMENTS

| 7,881,313 | B2 * | 2/2011 | Scherzer et al. ............. 370/401 |
| 2003/0012174 | A1 | 1/2003 | Bender et al. |
| 2004/0057398 | A1 | 3/2004 | Black |
| 2004/0095911 | A1 * | 5/2004 | Benveniste et al. ........... 370/338 |
| 2004/0192360 | A1 | 9/2004 | Tsai et al. |

FOREIGN PATENT DOCUMENTS

| KR | 10-2005-0048641 A | 5/2005 |
| KR | 10-2006-0059865 A | 6/2006 |

* cited by examiner

*Primary Examiner* — Duc C Ho
(74) *Attorney, Agent, or Firm* — Birch, Stewart, Kolasch & Birch, LLP

(57) ABSTRACT

The present application relates to a method for central node (CN) to remove inter-cell interference of an access point (AP) in a wireless access system according to the present invention, including: receiving feedback information at each time slot from a plurality of APs, the feedback information including channel measurement information between terminals in each AP and the coverage of each AP, or position information of each AP; obtaining a preference for each pattern, the pattern representing an ON or OFF operation of each AP at each time slot; determining a target time rate of each pattern on the basis of the obtained preference for each pattern; receiving an instantaneous transfer rate of terminals in the coverage of each AP for each pattern from the plurality of APs; and determining a pattern in order to minimize reference between each AP according to the received instantaneous transfer rate.

9 Claims, 6 Drawing Sheets pattern 1 : (BS1, BS2) = (ON, ON)
pattern 2 : (BS1, BS2) = (ON, OFF)
pattern 3 : (BS1, BS2) = (OFF, ON)

METHOD AND DEVICE FOR REMOVING INTER-CELL INTERFERENCE OF AN ACCESS POINT IN A WIRELESS ACCESS SYSTEM

CROSS REFERENCE TO RELATED APPLICATIONS

This non-provisional application is a National Stage entry under U.S.C. §371 of International Application No. PCT/KR2011/009609 filed on Dec. 14, 2011, which claims the benefit of U.S. Provisional Application No. 61/446,050 filed on Feb. 24, 2011. The entire contents of all of the above applications are hereby incorporated by reference.

The present invention relates to a wireless access system, and more particularly, to a method and device for removing inter-cell interference of an access point (AP) in a wireless access system.

BACKGROUND ART

Several methods are provided to solve performance deterioration caused by inter-cell interference in an environment where one network provider not several network providers controls several cells.

As methods for controlling inter-cell interference, there are provided a method for removing interference by using different frequency bands having no interference in neighboring cells and a method for reducing interference affected to a neighboring cell by reducing the power used in a cell, which affects high interference to the neighboring cell, through proper power control while using the same frequency band.

In this case, if one (or carrier) channel of inter-cell interference control through power control is only used, the optimized power control for inter-cell interference control is that the lowest power and the highest power are controlled without properly reducing or increasing the power. This power control may be referred to as power on/off control, and power on/off state of each access point may be defined as a pattern.

FIG. 1 is a diagram illustrating a shape of a pattern control for controlling inter-cell interference if two cells are provided.

Referring to FIG. 1, if two access points are provided, a total of three possible patterns may be provided. In other words, examples of the three possible patterns include a 'pattern 1' that uses two access points, a 'pattern 2' that uses the first access point only, and a 'pattern 3' that uses the second access point only.

In case of the pattern 1, since two access points are turned on at the same time, inter-cell interference occurs. On the other hand, in case of the pattern 2 or the pattern 3, since only one access point is turned off, interference in the other cells may have a channel status. However, a problem occurs in that the number of data to be simultaneously transmitted from the pattern 2 and the pattern 3 is reduced from two to one.

The related art is intended to reduce performance deterioration caused by inter-cell interference of each of a plurality of access points owned by one network provider. In this case, inter-cell interference is controlled through a method for turning on or off each access point every time slot, that is, a method for determining a pattern every time slot.

Hereinafter, a method for controlling inter-cell interference of each access point will briefly be described in accordance with a pattern method.

First of all, for convenience of description, terms will be defined as follows.

N: means a set or the number of access points or cells

S: means a set or the number of users $S_n$: means a set or the number of users who receive a service from an access point n P: means a set or the number of patterns $N_p$: means a set or the number of access points turned on in a pattern p $S_s(t)$: means an average transmission rate obtained by a user s to reach a time t $r_{s,p}(t)$: means an instantaneous transmission rate owned by a user s at a time t in case of a pattern P α: means a parameter that controls efficiency of network and equity between users β: means a constant required for update of the average transmission rate Scheduling Algorithm for User (User Equipment) within AP and Pattern Selection 1. AP measures an instantaneous transmission rate $r_{s,p}(t)$ of a user for each pattern at the time of every time slot. Also, the AP notifies (or transmits) a central node (CN) of the measured instantaneous transmission rate $r_{s,p}(t)$. In this case, it is general that the central node and the AP are connected with each other by the wire. However, the central node and the AP may be connected with each other by the wireless.

2. The central node determines an optimized pattern p* of patterns that mean a turn on or off state of each AP as below on the basis of an instantaneous transmission rate of a user every time, through the following Equation 1.

$$p^* = \underset{p \in P}{\operatorname{argmax}} \sum_{n \in N_p} \left[ \max_{s \in S_n} \frac{r_{s,p}(t)}{[R_s(t-1)]^\alpha} \right] \quad \text{[Equation 1]}$$

3. An access point $n \in N_{p^*}$ turned on at the pattern p*(t) defined by 2 as above determines a user (or user equipment), who will receive a service, through the following Equation 2.

$$s_n^* = \underset{s \in S_n}{\operatorname{argmax}} \frac{r_{s,p}(t)}{[R_s(t-1)]^\alpha} \quad \text{[Equation 2]}$$

4. The average transmission rate R(t) is updated in accordance with the following Equation 3 on the basis of the result of 3.

$$R_s(t+1) = \quad \text{[Equation 3]}$$
$$\begin{cases} (1-\beta)R_s(t) + \beta r_{s(t)} & \text{if } s = s_n^*(t) \\ (1-\beta)R_s(t) & \text{if } s \neq s_n^*(t) \end{cases} \text{ for } \forall s \in S_n, \forall n \in N$$

5. After t=t+1, the current step again returns to the step 1.

Inter-cell interference control means that frequency is divided to reduce interference that affects a neighboring cell, or means that the maximum available resource is reduced for a neighboring cell, for example, the available power is not used up. This does not cause a problem in solving inter-cell interference if one network provider includes several cells by installing several access points. This is because that gain occurs if a neighboring cell has better performance while using a resource of a specific cell, which is less than the maximum available resource.

However, if access points that cause interference to each other while using the same frequency band are owned by different network providers having different objects, a problem occurs in the method for controlling interference in accordance with the related art. If all the access points intend to use the maximum resource, many resources may be used but performance may be reduced due to interference.

Accordingly, although inter-cell interference control is required, it is difficult to give away resources for an access point of another network provider. In this respect, a method for improving performance on the basis of a specific contract rule, which is previously defined, while reducing damage caused by inter-cell interference, will be required.

DISCLOSURE

Technical Problem

An object of the present specification is to solve performance deterioration caused by interference between access points installed to be overlapped with each other, on the basis of a contract rule, if a plurality of network providers install the access points to individually manage networks.

Technical Solution

In one aspect of the present specification, a method for a central node to remove inter-cell interference of an access point (AP) in a wireless access system comprises the steps of: receiving feedback information from a plurality of APs every time slot, the feedback information including channel measurement information between each AP and a user equipment, which belongs to coverage of each AP, or position information of each AP; obtaining a preference for each pattern, the pattern representing an ON or OFF operation of each AP every time slot; determining a target time rate of each pattern on the basis of the obtained preference for each pattern; receiving an instantaneous transmission rate of the user equipments in the coverage of each AP for each pattern from the plurality of APs; and determining a pattern in order to minimize reference between the respective APs in accordance with the received instantaneous transmission rate.

Also, the preference for each pattern is calculated by the user equipments, which belong to the coverage of each AP, the respective APs, each network provider, or an entire network that includes the plurality of APs.

Also, the target time rate of each pattern is determined on the basis of the preference for each pattern calculated by an entire network that includes the plurality of APs.

Also, the pattern includes APs corresponding to the same network provider, which are turned on or off at the same time.

Also, the step of determining a pattern is performed in accordance with the following Equation:

$$p^* = \underset{p \in P}{\operatorname{argmax}} \sum_{n \in N_p} \left[ \max_{s \in S_n} \frac{r_{s,p}(t)}{[R_s(t-1)]^{\alpha}} + \beta(q_p^{min}(t-1) - q_p^{max}(t-1)) \right].$$

Also, in another aspect of the present specification, a method for operating an access point (AP) to remove inter-cell interference of the AP in a wireless access system comprises the steps of: transmitting feedback information to a central node (CN) every time slot, the feedback information including channel measurement information between each AP and user equipments, which belong to coverage of each AP, or position information of each AP; measuring an instantaneous transmission rate of the user equipments for each pattern, the pattern representing an ON or OFF operation of each AP every time slot; transmitting the measured instantaneous transmission rate to the central node; and allocating a resource to the user equipment, which belong to the coverage of the AP, in accordance with a pattern determined based on the measured instantaneous transmission rate.

Also, the step of allocating a resource includes determining user equipments, which will receive a service, among the user equipments belonging to the coverage of the AP; updating an average transmission rate of the determined user equipments; and updating a virtual queue of the AP in accordance with the average transmission rate of the updated user equipments.

Also, the step of determining user equipments which will receive a service is performed in accordance with the following Equation:

$$s_n^*(t) = \underset{s \in S_n}{\operatorname{argmax}} \frac{r_{s,p} \cdot (t)}{[R_s(t-1)]^{\alpha}}.$$

Also, the step of updating an average transmission rate is performed in accordance with the following Equation:

$$R_s(t+1) = \begin{cases} (1-\beta)R_s(t) + \beta r_{s(t)} & \text{if } s = s_n^*(t) \\ (1-\beta)R_s(t) & \text{if } s \neq s_n^*(t) \end{cases} \text{ for } \forall s \in S_n, \forall n \in N$$

Also, the step of updating a virtual queue is performed in accordance with the following Equation:

$$q_p^{min} = \begin{cases} [q_p^{min}(t-1) - 1]^+ + \theta_p^*, & \text{if } p = p^*(t), \\ q_p^{min}(t-1) + \theta_p^*, & \text{otherwise,} \end{cases} \text{ for } \forall p \in P$$

or $$q_p^{max} = \begin{cases} [q_p^{max}(t-1) - \theta_p^*]^+ + 1, & \text{if } p = p^*(t), \\ [q_p^{max}(t-1) - \theta_p^*]^+, & \text{otherwise,} \end{cases} \text{ for } \forall p \in P$$

In still another aspect of the present specification, a central node (CN) for removing inter-cell interference of an access point (AP) in a wireless access system comprises a radio frequency (RF) unit configured to transmit and receive a signal to and from an external unit; and a control unit connected with the RF unit, wherein the control unit controls the RF unit to receive feedback information from a plurality of APs every time slot, the feedback information including channel measurement information between each AP and a user equipment, which belongs to coverage of each AP, or position information of each AP, obtain a preference for each pattern, the pattern representing an ON or OFF operation of each AP every time slot, determine a target time rate of each pattern on the basis of the obtained preference for each pattern, receive an instantaneous transmission rate of the user equipments in the coverage of each AP for each pattern from the plurality of APs, and determine a pattern in order to minimize reference between the respective APs in accordance with the received instantaneous transmission rate.

In further still another aspect of the present specification, an access point (AP) for removing its inter-cell interference in a wireless access system comprises a radio frequency (RF) unit configured to transmit and receive a signal to and from an external unit; and a control unit connected with the RF unit, wherein the control unit controls the RF unit to transmit feedback information to a central node (CN) every time slot, the feedback information including channel measurement information between each AP and user equipments, which belong to coverage of each AP, or position information of each AP, measure an instantaneous transmission rate of the user equipments for each pattern, the pattern representing an ON or OFF operation of each AP every time slot, transmit the measured instantaneous transmission rate to the central node, and allocate a resource to the user equipment, which belong to the coverage of the AP, in accordance with a pattern determined based on the measured instantaneous transmission rate.

Also, the control unit controls the RF unit to determine user equipments, which will receive a service, among the user equipments belonging to the coverage of the AP, update an average transmission rate of the determined user equipments, and update a virtual queue of the AP in accordance with the average transmission rate of the updated user equipments.

Advantageous Effects

In this specification, a preference for each pattern is calculated, and a target time rate of each pattern is set on the basis of the calculated preference, whereby performance deterioration caused by interference between a plurality of access points may be solved.

Also, in this specification, a pattern is determined using an instantaneous transmission rate from each user equipment within coverage of an access point, and scheduling for each user equipment is performed on the basis of the determined pattern, whereby resources may be used efficiently.

BEST MODE FOR CARRYING OUT THE INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access).

The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The IEEE 802.16m is an evolved version of the IEEE 802.16e, and provides backward compatibility with a system based on the IEEE 802.16e.

The UTRA is a part of a universal mobile telecommunications system (UMTS).

A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

Hereinafter, reference will now be made in detail to the preferred embodiments of the present invention, examples of which are illustrated in the accompanying drawings. Wherever possible, the same reference numbers will be used throughout the drawings to refer to the same or like parts, and their repeated description will be omitted. Also, in the description of the present invention, detailed description of the known art, which may make the subject matter of the present invention obscure, will be omitted. Also, the accompanying drawings are intended to assist understanding of spirits of the present invention, and it is to be understood that the spirits of the present invention are not limited by the accompanying drawings. It is to be understood that the spirits of the present invention should cover all modifications, equivalents or replacements in addition to the accompanying drawings.

Figure 1:
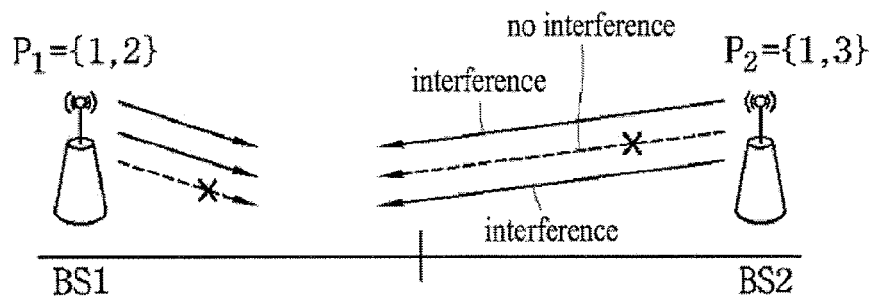
FIG. 1 is a diagram illustrating an example of a pattern control for controlling inter-cell interference if two cells exist.
Figure 2:
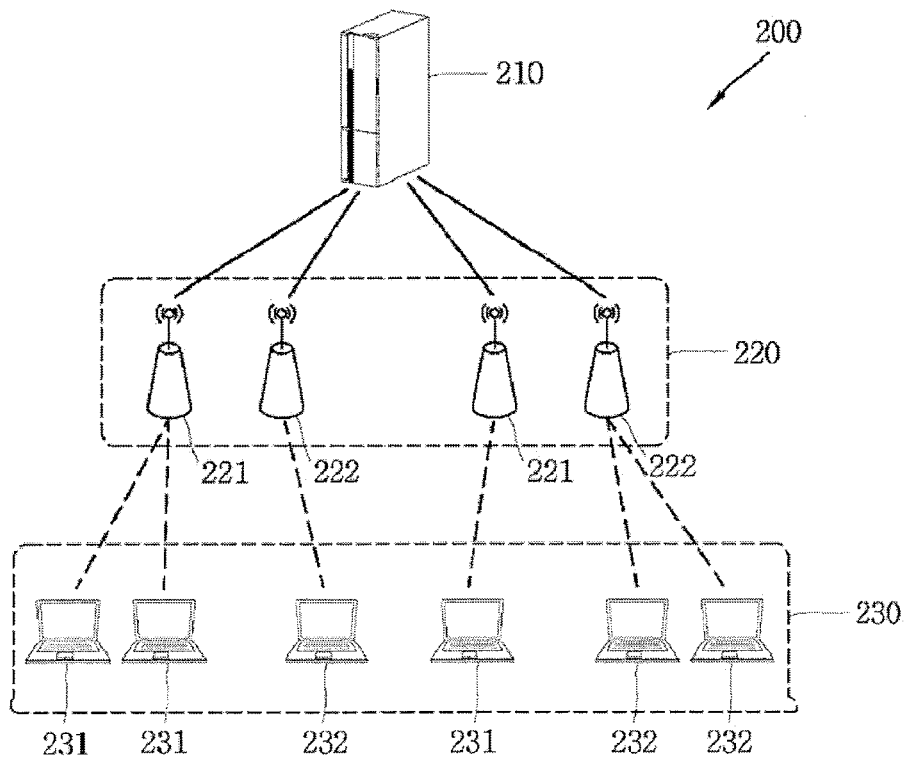
FIG. 2 is a conceptional diagram illustrating a wireless access system to which one embodiment of the present specification may be applied.

FIG. 2 is a conceptional diagram illustrating a wireless access system to which one embodiment of the present specification may be applied.

Referring to FIG. 2, a wireless access system 200 includes a central node (CN) 210, an access point (AP) 220, and a user equipment (or user) 230.

The central node (CN) 210 manages access points (APs) of all network providers. The central node 210 manages the access points per time slot, and determines an access point to be turned on or off, on the basis of information fed back from the access point. In this case, the feedback information may represent channel status information between the access point and user equipments located within coverage of the access point, or position information of the access point.

Also, the state that each access point is turned off or on will be referred to as a pattern.

The access point (AP) 220 is connected with the central node by a wire or wireless, and is connected with the user equipments 231 and 232 within coverage of the access point. In this case, the access points may be identified per network provider. In other words, as shown in FIG. 2, the access points referred to as same reference numbers correspond to those 221 and 222 corresponding to the same network provider.

Also, users (or user equipments) who (or which) perform communication with each access point are located in each access point, wherein each user measures a channel status to efficiently use a timely varied radio resource, and feeds the measured channel status back to the access point.

Accordingly, the information fed back from the access point to the central node means the channel status information of users served by each access point.

As shown in FIG. 2, two access points 21 and 22 belong to one network provider, and two access points 31 and 32 belong to another network provider. Turn on or off pattern of these access points is determined by one central node per slot. Since the access point 21 provides a service to users 211 and 212, the access point 31 provides a service to a user 221, and the access point 32 provides a service to users 321 and 322, the access point turned on per time may select and schedule one of the users who receive the service therefrom.

Figure 3:
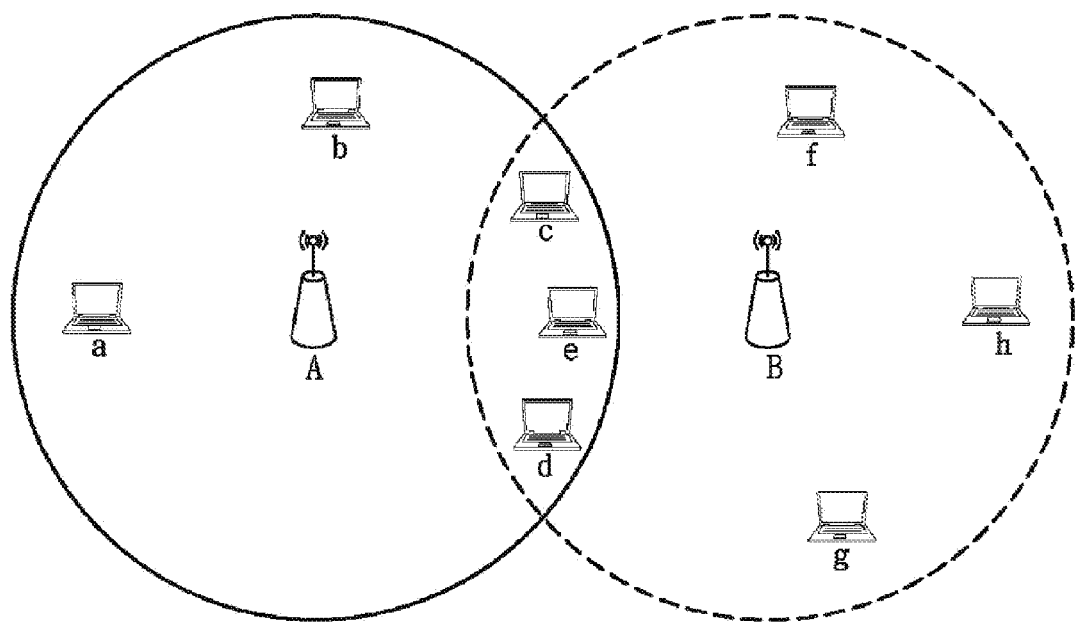
FIG. 3 is a diagram illustrating a topology when two cells exist to show an example of a method for searching for a target time rate of each pattern on the basis of pattern preference according to one embodiment of the present specification.

FIG. 3 is a diagram illustrating a topology when two cells exist to show an example of a method for searching for a target time rate of each pattern on the basis of pattern preference according to one embodiment of the present specification.

Referring to FIG. 3, an access point A is owned by a network provider A, and an access point B is owned by a network provider B. Users a, b, c and d receive a service from the cell A, wherein the users c and d located at an overlap zone interfere with the cell B. Users e, f, g and h receive a service from the cell B, wherein the user e located at an overlap zone interfere with the cell A. In the topology of FIG. 3, for conciseness, a transmission rate is set to '1' if no interference occurs, whereas a transmission rate is set to '0' if interference occurs. Also, in a contract relation between the two network providers, it is assumed that the network provider A has a weight value higher than that of the network provider B as much as twice.

A method for searching for a target time rate of a pattern based on pattern preference through the topology of FIG. 3 will be described later.

Hereinafter, a scheduling method of users on the basis of pattern preference, pattern selection and specific pattern to control inter-cell interference of an access point suggested in this specification will be described in detail.

First of all, this specification is intended to control interference based on a contract rule between the network providers without using the maximum resource, which may be used to reduce interference affected to an access point of other network provider, within an unconditionally small range, whereby performance deterioration caused by interference may be avoided.

To this end, this specification suggests a method for satisfying a contract rule while controlling pattern based inter-cell interference. In other words, the central node determines a pattern of each access point to be turned on or off at a corresponding time slot. Accordingly, in this specification, a preference of a pattern is provided, whereby interference may be controlled based on the contract rule.

In this case, in addition to the contract relation, an interference level affected to a neighboring cell may be considered additionally to determine when or how long each access point is turned on. According to the interference level affected to the neighboring cell, if an access point occurs in the middle of two access points which are operated without interference, the access point located in the middle of the two access points affects the two access points and the two existing access points affect the middle access point only, whereby the middle access point should have a penalty corresponding to interference of twice. That is, the middle access point is turned on for a time shorter than that of the existing access points. In this case, the network provider having the middle access point may remove the penalty through a contract rule of the higher price to cover interference more affected to the neighboring access points, or may operate the middle access point in a state of the penalty.

Figure 4:
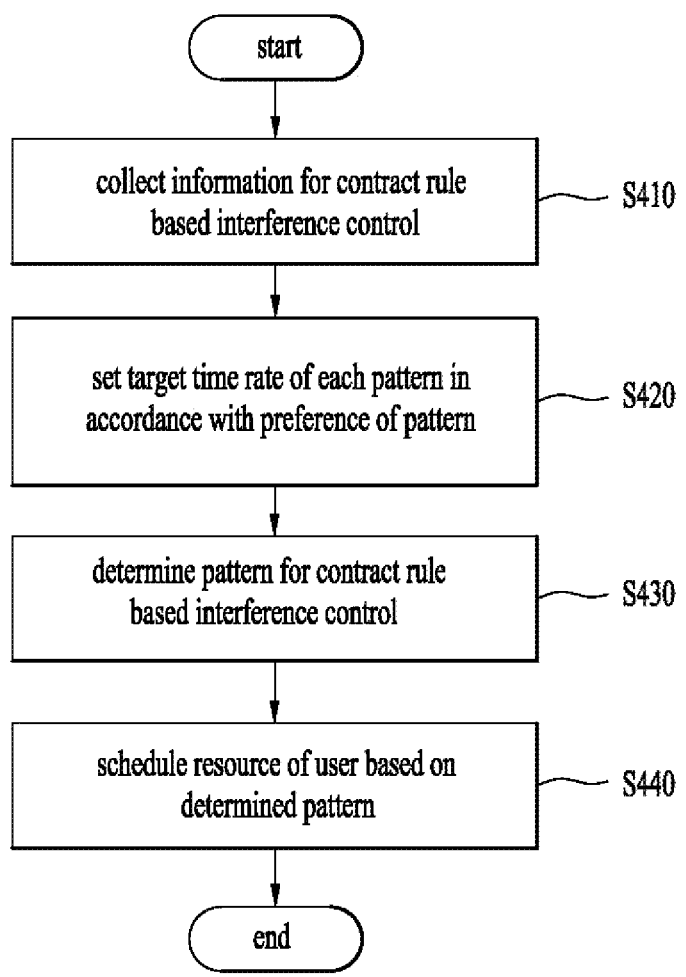
FIG. 4 is a flow chart illustrating a method for controlling inter-cell interference in accordance with one embodiment of the present specification.

FIG. 4 is a flow chart illustrating a method for controlling inter-cell interference in accordance with one embodiment of the present specification.

First of all, the central node and/or the access point collects information for rule based interference control (S410). In other words, the central node collects information fed back from each access point, and each access point may collect information fed back from user equipments (or users) within its coverage.

Each access point collects channel information on respective users within its coverage. In other words, each of the access points 221 and 222 measures radio channel information of the users 231 and 232 associated with each access point.

Also, the central node collects information from each access point. In other words, each of the access points 221 and 222 notifies the central node 210, which determines interference control, of information required for interference control. In this case, the information required for interference control may be channel information between the users within each access point, or may be position information of the access point.

Afterwards, the central node sets (or determines) a target time rate of each pattern on the basis of preference of each pattern (S420).

In other words, the central node sets the target time rate of each pattern on the basis of a preference of a pattern defined as follows to perform interference control that includes an interference level between the access points and a contract relation between the network providers.

A pattern selection method of the central node for allowing each access point to efficiently allocate a resource to users while maintaining the set target time rate of each pattern and a resource allocation scheduling method of each access point will be described later.

Hereinafter, terminologies for calculating preference of a pattern will be defined as follows.

$l^s_p$: preference of a pattern p of user s
$l^n_p$: preference of a pattern p of access point n
$l^g_p$: preference of a pattern p of network provider g
$l_p$: preference of a pattern p of radio network
$\overline{r_{s,p}}$: average transmission rate obtained when user s is pattern p
$\mu_p$: the number of access points turned in a pattern p Preference of each pattern may be calculated as follows.

1. Calculation of a preference of each pattern per user (or user equipment)

$$l^s_p = \begin{cases} 1, & \text{if } p = \text{argmax}\,\overline{r_{s,p}}\mu_p, \\ 0, & \text{otherwise,} \end{cases} \text{ for } \forall\, p \in P, \forall\, s \in S \qquad \text{[Equation 4]}$$

In the topology of FIG. 3, if $\overline{r_{s,p}}$ is determined as 0 or 1 in accordance with interference, pattern preference of the users is as illustrated in Table 1 below.

TABLE 1

| User | Transmission or not | | | Preference |
|---|---|---|---|---|
| | Pattern 1 | Pattern 2 | Pattern 3 | |
| a | ○ | ○ | X | Pattern 1 ($l_1^a = 1$) |
| b | ○ | ○ | X | Pattern 1 ($l_1^b = 1$) |
| c | X | ○ | X | Pattern 2 ($l_2^c = 1$) |
| d | X | ○ | X | Pattern 2 ($l_2^d = 1$) |
| e | X | X | ○ | Pattern 3 ($l_3^e = 1$) |
| f | ○ | X | ○ | Pattern 1 ($l_1^f = 1$) |
| g | ○ | X | ○ | Pattern 1 ($l_1^g = 1$) |
| h | ○ | X | ○ | Pattern 1 ($l_1^h = 1$) |

2. Calculation of a preference of each pattern per access point $$l_p^n = \frac{\sum_{s \in S_n} l_p^s}{S_n}, \text{ for } \forall p \in P, \forall n \in N \quad \text{[Equation 5]}$$

In the topology of FIG. 3, if $\overline{r_{s,p}}$ is determined as 0 or 1 in accordance with interference, pattern preference of the access point is as illustrated in Table 2 below.

TABLE 2

| Cell | Pattern 1 | Pattern 2 | Pattern 3 |
|---|---|---|---|
| A | $l_1^A = 0.5$ | $l_2^A = 0.5$ | $l_3^A = 0$ |
| B | $l_1^B = 0.75$ | $l_2^B = 0$ | $l_3^B = 0.25$ |

3. Calculation of a preference of each pattern per network provider $$l_p^g = w_g \sum_{n \in N_g} l_p^n, \text{ for } \forall p \in P, \text{ for } \forall g \in G \quad \text{[Equation 6]}$$

In the topology of FIG. 3, if $\overline{r_{s,p}}$ is determined as 0 or 1 in accordance with interference, and if the contract rule between the network provider A and the network provider B is 2: 1, pattern preference of the network providers is as illustrated in Table 3 below.

TABLE 3

| Provider | Pattern 1 | Pattern 2 | Pattern 3 |
|---|---|---|---|
| A | $l_1^A = 1$ | $l_2^A = 1$ | $l_3^A = 0$ |
| B | $l_1^B = 0.75$ | $l_2^B = 0$ | $l_3^B = 0.25$ |

4. Calculation of a preference of each pattern in the network $$l_p = \sum_{g \in G} l_p^g, \text{ for } \forall p \in P \quad \text{[Equation 7]}$$

In the topology of FIG. 3, if $\overline{r_{s,p}}$ is determined as 0 or 1 in accordance with interference, and if the contract rule between the network provider A and the network provider B is 2: 1, pattern preference of the network is as illustrated in Table 4 below.

TABLE 4

| Pattern 1 | Pattern 2 | Pattern 3 |
|---|---|---|
| $l_1 = 1.75$ | $l_2 = 1$ | $l_3 = 0.25$ |

5. Calculation of a target time rate of each pattern based on pattern preference in the network The target time rate $\theta_p^*$ of each pattern is determined by the following Equation 8.

$$\theta_p^* = \frac{l_p}{\sum_{g \in G} l_p} \quad \text{[Equation 8]}$$

In the topology of FIG. 3, if $\overline{r_{s,p}}$ is determined as 0 or 1 in accordance with interference, and if the contract rule between the network provider A and the network provider B is 2: 1, the target time rate of each pattern is as follows.

$$\theta_1^* = \frac{7}{12}, \theta_2^* = \frac{1}{3}, \theta_3^* = \frac{1}{12}$$

Pattern preference described above may be calculated in brief through the following method 1 or 2.

1. Pattern preference of each access point may be determined by estimating an interference level between the access points based on information such as the position of the access points without based on preference of the users served by the existing access point. Through this method, the procedure of collecting pattern preference of the users for each pattern will be omitted.

2. As the pattern is defined in accordance with the turn on or off state of all the access points, a total number of patterns are increased in accordance with the number of access points. In order to solve complexity increased as preference for the pattern is searched, the pattern may be defined as the state that all the access points of each network provider are turned on or off at one time not the state that each access point is turned on or off, whereby the number of patterns may be reduced.

In the same manner as 2, in order to prevent the number of patterns from being increased as the number of access points is increased, the number of central nodes may be increased, whereby the access points of the entire network may be divided into several small groups and the central node per group calculates pattern preference independently from the other central nodes of the other groups. As a result, pattern preference may be calculated in brief.

Afterwards, the central node selects (or determines) a pattern for contract rule based inter-cell interference control (S430), and the access point schedules a resource of each user in accordance with the selected pattern (S440).

Hereinafter, pattern selection (or determination) or a resource scheduling method of a user will be described in more detail.

The central node selects a pattern for determining whether to turn on or off what access point per time slot. Afterwards, the access points receive the selected pattern from the central node, and if the access points are turned on in accordance with the selected pattern, they select a user who will receive a service therefrom.

First of all, terminologies will be defined as follows.

$\theta_p^*$: target time rate of pattern p $q_p^{max}$: virtual queue that prevents pattern p from being greater than target time rate $q_p^{min}$: virtual queue that prevents pattern p from being smaller than target time rate Pattern selection of the central node and a resource scheduling method for a user of an access point in accordance with the selected pattern will be described.

(1) The access point measures an instantaneous transmission rate rs,p(t) of the user for each pattern at the time of every time slot, and transmits the measured result to the central node.

(2) The central node determines the pattern, which means the turn on or off state of the access point every time slot on the basis of the instantaneous transmission rate of the user, which is received through (1) above, through the following Equation 9.

$$p^* = \underset{p \in P}{\operatorname{argmax}} \sum_{n \in N_p} \left[ \max_{s \in S_n} \frac{r_{s,p}(t)}{[R_s(t-1)]^\alpha} + \beta(q_p^{min}(t-1) - q_p^{max}(t-1)) \right]$$ [Equation 9]

(3) The access point n(n☐Np) turned on in the pattern p*(t) determined through the above Equation 9 determines a user, who will receive a service therefrom, through the following Equation 10.

$$s_n^*(t) = \underset{s \in S_n}{\operatorname{argmax}} \frac{r_{s,p^*}(t)}{[R_s(t-1)]^\alpha}$$ [Equation 10]

(4) The access point updates the average transmission rate R(t) for each user in accordance with the following Equation 11 on the basis of the above Equation 10.

$$R_s(t+1) = \begin{cases} (1-\beta)R_s(t) + \beta r_{s(t)} & \text{if } s = s_n^*(t) \\ (1-\beta)R_s(t) & \text{if } s \neq s_n^*(t) \end{cases} \text{ for } \forall s \in S_n, \forall n \in N$$ [Equation 11]

(5) The access point updates the virtual queue in accordance with the following Equations 12 and 13 on the basis of the result of (3).

$$q_p^{min} = \begin{cases} [q_p^{min}(t-1) - 1]^+ + \theta_p^*, & \text{if } p = p^*(t), \\ q_p^{min}(t-1) + \theta_p^*, & \text{otherwise,} \end{cases} \text{ for } \forall p \in P$$ [Equation 12]

$$q_p^{max} = \begin{cases} [q_p^{max}(t-1) - \theta_p^*]^+ + 1, & \text{if } p = p^*(t), \\ [q_p^{max}(t-1) - \theta_p^*]^+, & \text{otherwise,} \end{cases} \text{ for } \forall p \in P$$ [Equation 13]

(6) Afterwards, the access point returns to (1) and repeats the processes of (1) to (5).

In this case, a scheduling method of the access point to allocate a resource to each user equipment is as follows.

First of all, the access point transmits its queue (Q) information to each user equipment. In this case, the queue means the virtual queue and its upper bound is set. Also, the access point is allocated with a minimum assured resource from the central node.

Afterwards, the access point receives information related to a link rate from each user equipment. In this case, the link rate may be controlled in accordance with the following Equation 14.

$$r_l = \frac{w_l}{q_l - \mu_m}$$ [Equation 14]

In this case, $r_l$ means a link rate, and $w_l$ means a link weight.

Afterwards, the access point schedules resource allocation for each user equipment in accordance with the link rate related information received from each user equipment. In other words, the access point updates the queue corresponding to each user equipment. In this case, Q-based adaptive CSMA may be used as a method of the scheduling.

The pattern selection of the central node as described above may be simplified by the following method.

In other words, instead of an algorithm based on an instantaneous transmission rate of users who desire to efficiently use resources and virtual queue for maintaining the target rate of the pattern previously defined as (2), the order of patterns, which may maintain the previously defined target time rate $\theta_p^*$, may previously be defined by a round-robin scheme, whereby the pattern may be determined in accordance with the defined order every time.

For example, if the target time rate of the 'pattern 1' is 0.5 and the target time rate of the 'pattern 2' is 0.5, the patterns may be defined in the order of pattern 1→pattern 2→pattern 1→pattern 2→pattern 1→pattern 2→pattern 1→pattern 2→pattern 1 . . . .

For another example, if the target time rate of the 'pattern 1' is 0.25 and the target time rate of the 'pattern 2' is 0.75, the patterns may be defined in the order of pattern 1→pattern 2→pattern 2→pattern 2→pattern 1→pattern 2→pattern 2→pattern 2→pattern 1 . . . .

Figure 5:
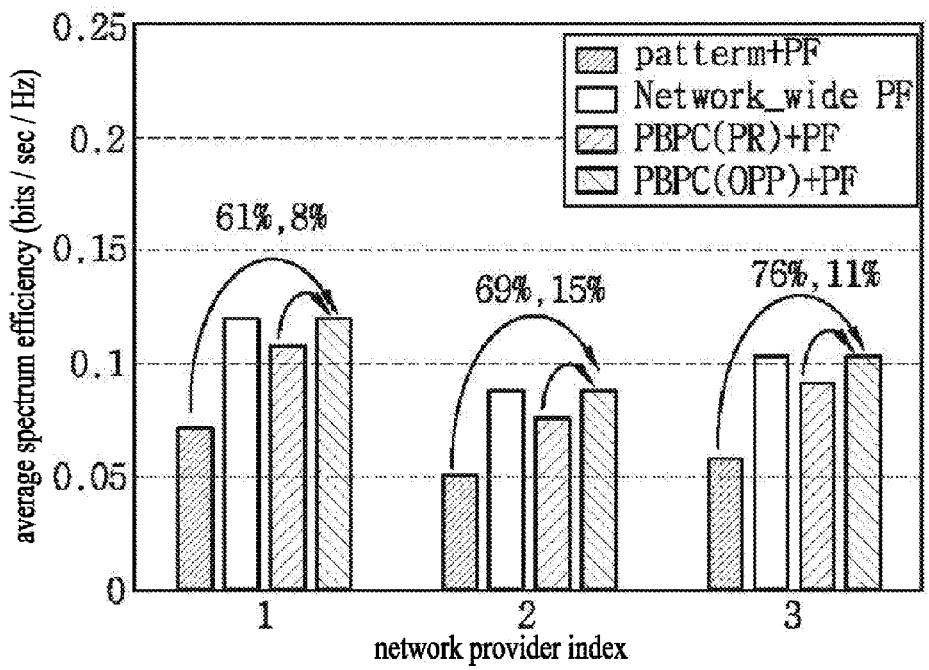
FIG. 5 is a diagram illustrating a result of efficient use of radio resource through a method for allocating resources based on a contract rule suggested in this specification.

FIG. 5 is a diagram illustrating a result of efficient use of radio resources through a method for allocating resources based on a rule suggested in this specification.

In FIG. 5, pattern+PF represents that each access point schedules users, who are served therefrom, in accordance with inter-cell interference without pattern control (interference control) in a state that all the access points are turned on.

Network-wide WPF represents that pattern control and scheduling are performed to efficiently use resources of the entire network without considering the contract rule between the network providers.

PBPC(RR)+PF represents that each access point schedules portion based pattern control based on the previously defined time rate to a user in accordance with the pattern selection simplification method, that is, pattern selection of round-robin scheme, on the basis of preference considering the contract rule between the network providers.

PBPC(OPP)+PF represents that each access point schedules portion based pattern control based on the previously defined time rate to a user in accordance with a random one of the pattern selection methods (1) to (6), on the basis of preference considering the contract rule between the network providers.

In other words, as shown in FIG. 5, it is noted that radio resources are efficiently used by effective interference control in accordance with the method of PBPC, which includes a contract rule. It is also noted that random use of the PBPC reflects time variable characteristics of the radio resources better to obtain higher performance.

Figure 6:
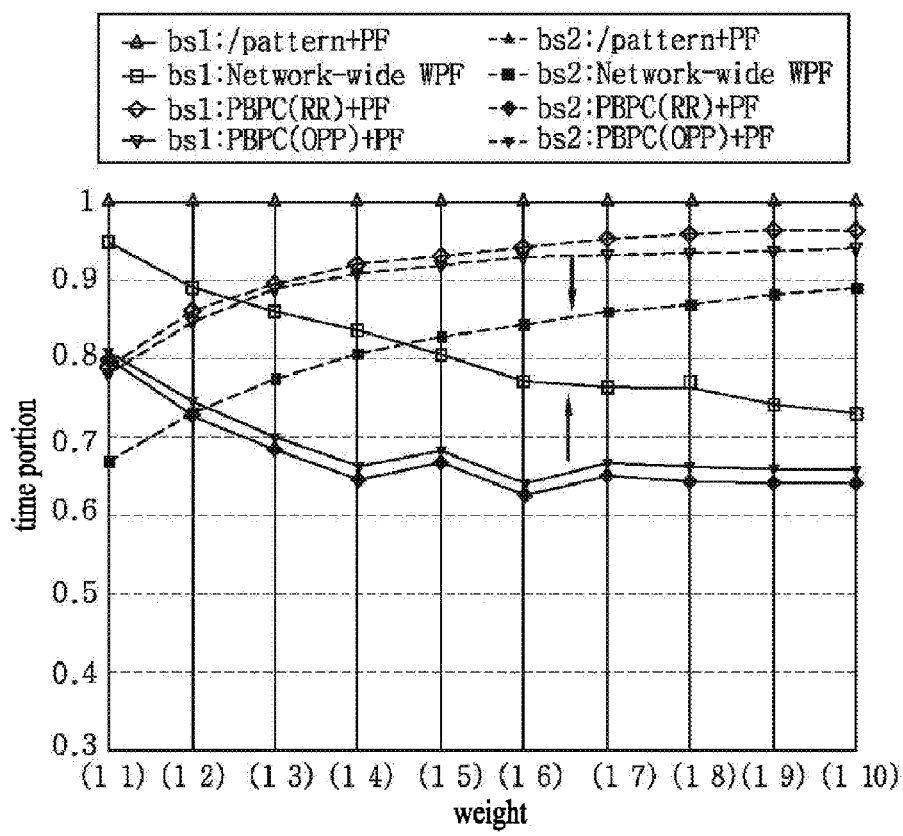
FIG. 6 and FIG. 7 are graphs illustrating that interference control based on a contract rule suggested in this specification is performed in accordance with a contract relation between actual network providers and interference level between access points.
Figure 7:
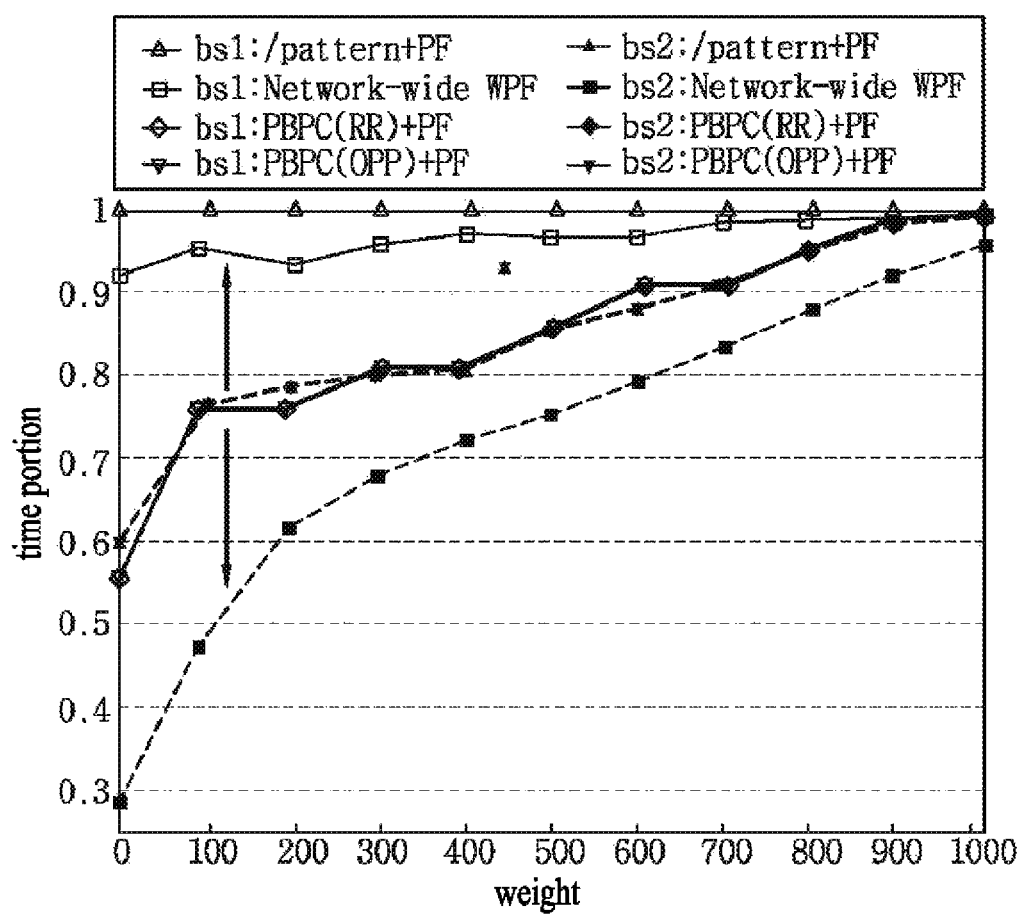

FIG. 6 and FIG. 7 are graphs illustrating that interference control based on a contract rule suggested in this specification is performed in accordance with a contract relation between actual network providers and interference level between access points.

In other words, FIG. 6 illustrates a time rate that two access points BS1 and BS2, which respectively belong to two network providers, are turned on in accordance with a contract rule between the two network providers, and FIG. 7 illustrates a time rate that two access points BS1 and BS2 are turned on as interference levels of the two access points owned respectively by two network providers are varied.

Referring to FIG. 6, 50 users exist in the BS1 while 10 users exist in the BS2. As a weight value of the second one of the two network providers is increased, that is, if the second network provider has priority in the contract rule, it is noted that the turn-on time rate of the access point BS2 of the second network provider is increased. However, it is noted that Network-wide WPF, which does not include the contract rule, is affected by the number of users of the access point.

Referring to FIG. 7, 50 users exist in the BS1 while 10 users exist in the BS2. Two network providers having two access points respectively have a contract rule equivalent to each other.

In this case, as the distance between the two access points is increased, that is, performance deterioration based on interference between the two access points is reduced, it is noted that the turn-on time rate of the two access points is increased gradually. However, in case of Network-wide WPF, which does not include the contract rule, a problem occurs in that the BS1 is turned on for a longer time in accordance with the number of users of the access point in spite of the same contract rule.

The aforementioned embodiments and modified examples may be achieved by combination. Accordingly, each embodiment may be implemented by combination if necessary. It will be apparent to those skilled in the art that the combination may be implemented easily. Hereinafter, the combination will not be described in detail. However, it is to be understood that the combination is not excluded from the present invention and pertains to the scope of the present invention.

The aforementioned embodiments and modified examples may be implemented by various means. For example, the embodiments of the present invention may be implemented by hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

For example, the method according to the present invention may be stored in a storage medium (for example, internal memory, flash memory, hard disk, etc.), and may be implemented by codes or command languages within a software program that may be implemented by the processor (for example, microprocessor). This will be described with reference to FIG. 8.

Figure 8:
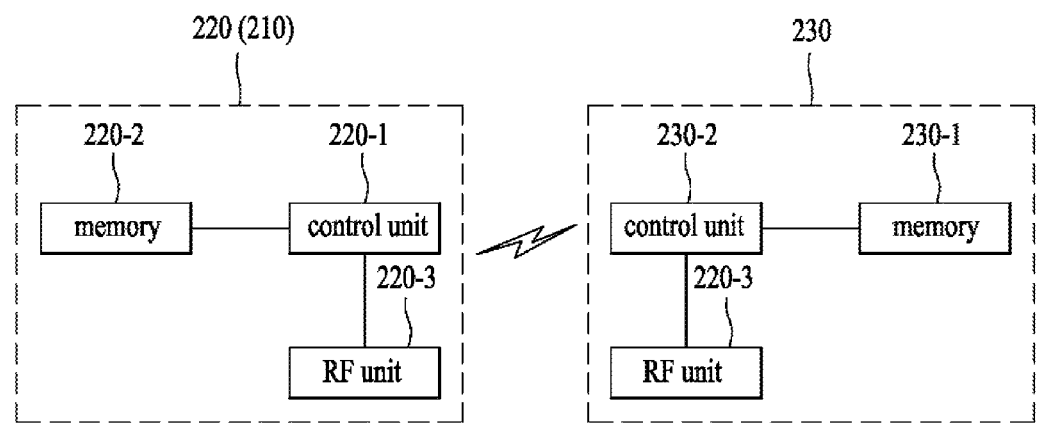
FIG. 8 is an internal block diagram illustrating a user equipment, a base station, and a central node in a wireless access system to which one embodiment of this specification may be applied.

FIG. 8 is an internal block diagram illustrating a user equipment, a base station, and a central node in a wireless access system to which one embodiment of this specification may be applied.

A user equipment 230 includes a control unit 230-1, a memory 230-1 and a radio frequency (RF) unit 230-3.

The user equipment 230 may be fixed or have mobility, and may be referred to as a user terminal (UT), a subscriber station (SS), a wireless device, an advanced mobile station (AMS), and a user.

Also, the user equipment includes a display unit and a user interface unit.

The control unit 230-1 implements functions, processes, and/or methods, as suggested. Layers of a radio interface protocol may be implemented by the control unit 230-1.

The memory 230-2 is connected with the control unit 230-1, and stores a protocol or parameter for wireless communication. In other words, the memory 230-2 stores user equipment driving system, application and normal files. The RF unit 230-3 is connected with the control unit 230-1 and transmits and/or receives a radio signal.

Additionally, the display unit displays various kinds of information of the user equipment. Examples of the display unit may include a liquid crystal display (LCD) and an organic light emitting diode (OLED), which are well known. The user interface unit may be configured by combination of well known user interfaces such as keypad and touch screen.

A base station 220 includes a control unit 220-1, a memory 220-2, and a radio frequency (RF) unit 220-3.

In this case, the base station 220 generally means a fixed station that performs communication with the user equipment, and may be referred to as terms such as a node B, a base transceiver system (BTS), and an access point. One or more cells may exist in one base station.

In this case, the central node (CN) may constitute one device together with the base station, or may be configured as a separate device. The central node may include a control unit, a memory and an RF unit.

The control unit 220-1 implements functions, processes, and/or methods, as suggested. Layers of a radio interface protocol may be implemented by the control unit 220-1.

The memory 220-2 is connected with the control unit 220-1, and stores a protocol or parameter for wireless communication.

The RF unit 220-3 is connected with the control unit 220-1 and transmits and/or receives a radio signal.

The control unit 210-1 or 220-1 may include an application-specific integrated circuit (ASIC), other chip set, logic circuit, and/or a data processing unit. The memory 210-2 or 210-2 may include a read-only memory (ROM), a random access memory (RAM), a flash memory, a memory card, a storage medium and/or other storage unit. The RF unit 210-3 or 210-3 may include a baseband circuit for processing a radio signal. When the embodiment is implemented by software, the aforementioned method may be implemented by a module (process, function, etc.) for performing the aforementioned functions. The module may be stored in the memory 210-2 or 220-2, and may be implemented by the control unit 210-1 or 220-1.

The memory 210-2 or 220-2 may be located inside or outside the control unit 210-1 or 220-1, and may be connected with the control unit 210-1 or 220-1 by a well-known means.

Also, it is to be understood that technical terms used in this specification are used to describe a specific embodiment and are not indeed to restrict the present invention. Also, it is to be understood that the technical terms used in this specification should generally be understood by the person with ordinary skill in the art to which the present invention pertains unless defined separately, and should not be defined to refer to too comprehensive or reduced meaning. Also, when the technical terms used in this specification fail to exactly express the technical spirits of the present invention, the terms should be replaced with those that may be understood by the person with ordinary skill in the art. Also, general terms used in the present invention should be defined in accordance with the context as defined in a dictionary and should not be defined to refer to too reduced meaning.

Also, the singular expression used in this specification includes the plural expression unless meant differently on the context. In this application, it is to be understood that the terms such as "comprise" and "include" should not be defined to essentially include all of various elements or various steps disclosed in this specification and should be defined to include some of the elements or steps or further include additional elements or steps.

Also, although the terms indicating the ordinal number such as first and second may be used to describe various elements, the elements should not be restricted by the terms. The terms are used to identify one element from another element. For example, the first element may be referred to as the second element and vice versa within the scope of the present invention.

The expression "an element is connected with another element" means that an element may directly be connected with another element or still another element may exist therebetween. On the other hand, the expression "an element is directly connected with another element" means that no still another element exists therebetween.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The invention claimed is:

1. A method for a central node (CN) to remove inter-cell interference of an access point (AP) in a wireless access system, the method comprising:

receiving, by the CN, feedback information from a plurality of APs every time slot, the feedback information including channel measurement information between each AP and a user equipment (UE), which belongs to coverage of each AP, or position information of each AP;

obtaining, by the CN, a preference for each pattern, the pattern representing an ON or OFF operation of each AP every time slot;

determining, by the CN, a target time rate of each pattern on a basis of the obtained preference for each pattern;

receiving, by the CN, an instantaneous transmission rate of UEs in the coverage of each AP for each pattern from the plurality of APs; and determining, by the CN, a pattern in order to minimize reference between the respective APs in accordance with the received instantaneous transmission rate.

2. The method according to claim 1, wherein the obtained preference for each pattern is calculated by the UEs, which belong to the coverage of each AP, the respective APs, each network provider, or an entire network that includes the plurality of APs.

3. The method according to claim 2, wherein the target time rate of each pattern is determined on the basis of the obtained preference for each pattern calculated by an entire network that includes the plurality of APs.

4. The method according to claim 1, wherein the pattern includes APs corresponding to a same network provider, which are turned on or off at a same time.

5. A method for operating an access point (AP) to remove inter-cell interference of the AP in a wireless access system, the operation method comprising:

transmitting, by the AP, feedback information to a central node (CN) every time slot, the feedback information including channel measurement information between each AP and user equipments (UEs), which belong to coverage of each AP, or position information of each AP;

measuring, by the AR, an instantaneous transmission rate of the user equipments for each pattern, the pattern representing an ON or OFF operation of each AP every time slot;

transmitting, by the AP, the measured instantaneous transmission rate to the CN; and allocating, by the AP, a resource to the UEs, which belong to the coverage of the AP, in accordance with a pattern determined based on the measured instantaneous transmission rate.

6. The method according to claim 5, wherein the step of allocating a resource includes:

determining UEs, which will receive a service, among the UEs belonging to the coverage of the AP;

updating an average transmission rate of the determined UEs; and updating a virtual queue of the AP in accordance with the average transmission rate of the updated UEs.

7. A central node (CN) for removing inter-cell interference of an access point (AP) in a wireless access system, the CN comprising:

a radio frequency (RF) unit configured to transmit and receive a signal to and from an external unit; and a control unit connected with the RF unit, wherein the control unit controls the RF unit to receive feedback information from a plurality of APs every time slot, the feedback information including channel measurement information between each AP and a user equipment (UE), which belongs to coverage of each AP, or position information of each AP, obtain a preference for each pattern, the pattern representing an ON or OFF operation of each AP every time slot, determine a target time rate of each pattern on a basis of the obtained preference for each pattern, receive an instantaneous transmission rate of UEs in the coverage of each AP for each pattern from the plurality of APs, and determine a pattern in order to minimize reference between the respective APs in accordance with the received instantaneous transmission rate.

8. An access point (AP) for removing its inter-cell interference in a wireless access system, the AP comprising:
- a radio frequency (RF) unit configured to transmit and receive a signal to and from an external unit; and
- a control unit connected with the RF unit,
- wherein the control unit controls the RF unit to transmit feedback information to a central node (CN) every time slot, the feedback information including channel measurement information between each AP and UEs, which belong to coverage of each AP, or position information of each AP, measure an instantaneous transmission rate of the UEs for each pattern, the pattern representing an ON or OFF operation of each AP every time slot, transmit the measured instantaneous transmission rate to the CN, and allocate a resource to the UEs, which belong to the coverage of the AP, in accordance with a pattern determined based on the measured instantaneous transmission rate.

9. The AP according to claim 8, wherein the control unit controls the RF unit to determine UEs, which will receive a service, among the UEs belonging to the coverage of the AP, update an average transmission rate of the determined UEs, and update a virtual queue of the AP in accordance with the average transmission rate of the updated UEs.

* * * * *